United States Patent [19]

Keeling et al.

[11] 4,426,227

[45] Jan. 17, 1984

[54] PRINTING COMPOSITIONS

[75] Inventors: Robert A. Keeling; John Hunt, both of Stoke-on-Trent, England

[73] Assignee: Harrison Mayer Limited, Stoke-on-Trent, England

[21] Appl. No.: 306,392

[22] Filed: Sep. 28, 1981

[30] Foreign Application Priority Data

Jan. 10, 1980 [GB] United Kingdom ............... 8031658

[51] Int. Cl.³ .................................................. C09D 11/02
[52] U.S. Cl. ........................................ 106/27; 106/30; 260/DIG. 38; 523/160
[58] Field of Search .................. 106/19, 27, 30, 291; 523/160; 260/DIG. 38

[56] References Cited

U.S. PATENT DOCUMENTS

| | | | |
|---|---|---|---|
| 3,378,509 | 4/1968 | Jerabek | 523/160 |
| 3,891,581 | 6/1975 | Argenio | 106/22 |
| 4,018,728 | 4/1977 | Priest | 523/160 |
| 4,066,585 | 1/1978 | Schepp et al. | 106/27 |
| 4,163,001 | 7/1979 | Carumpalos et al. | 106/20 |
| 4,267,000 | 5/1981 | Dix et al. | 523/160 |

*Primary Examiner*—John Kight, III
*Assistant Examiner*—Amelia B. Yarbrough
*Attorney, Agent, or Firm*—Alan H. Levine

[57] ABSTRACT

A printing medium comprises a thermoplastic resin and a rheology-controlling diluent, the medium having a melting point of between 40° and 80° C., and being non-tacky at room temperature. The diluent is preferably selected from liquid resins, high molecular weight esters, fatty alcohols and saturated fatty acids. The medium is used in a method of decorating an article comprising forming an image of the decoration in a flowable ink composition on a heated support, picking up the image from the support on a silicone transfer member at a lower temperature to form a flexible film on the transfer member in a semi-fluid condition, and applying the film to an article to be decorated within a period of time during which the composition remains semi-fluid whereby the composition solidifies immediately on contact with the surface of the article to form a non-tacky coating thereon.

10 Claims, No Drawings

PRINTING COMPOSITIONS

This invention relates to printing compositions and is especially, but not exclusively, applicable to compositions for use in printing or decorating heat resistant substrates such as glass, ceramics, including tiles and tableware, or enamelled metals.

Off-set printing techniques are known in which a printed image is transferred by a flexible pad or other carrier member from a printing station to a decorating station where the image is applied to an article to be decorated. Hitherto pads formed from gelatine were widely employed, but more recently silicone pads have been employed and the decorating compositions or inks used for such purposes must be compatible with the silicone pad and hitherto have been designed to dry on the decorated article by solvent evaporation or by a combination of solvent evaporation and oxidation.

Various problems are encountered in utilising decorating inks of this kind. While such inks are generally suitable for relatively low printing speeds and for single colour printing, they are not entirely satisfactory when used for high speed multi-colour printing. Moreover, such inks do not always give 100% transfer from the pad to the article being decorated and hence, when used for multi-colour printing there is a tendency for the ink retained on the transfer pad at one decorating stage to be transferred to the article during subsequent stages thereby resulting in reject items. Moreover, inks of this type are subject to changes in rheological and printing properties throughout the printing run due to the volatilisation of solvents. This necessitates frequent adjustment of ink and machine settings to ensure colour consistency which is time consuming and inconvenient. Many such inks also have a limited shelf life.

It is an object of the present invention to obviate or mitigate at least some of these disadvantages.

According to one aspect of the invention there is provided a printing medium comprising a thermoplastic resin and a rheology-controlling diluent, the medium having a melting point of between 40° and 80° C. and being non-tacky at room temperature.

Preferably the rheology-controlling diluent comprises a liquid resin, a high molecular weight ester, a fatty alcohol or a saturated fatty acid. The term "high molecular weight ester" is used herein to refer to esters having molecular weights greater than 200.

Preferably the medium comprises from 30% to 98% of thermoplastic resin and from 2% to 70% of diluent. Advantageously the thermoplastic resin component may comprise two or more resins to extend the thermoplasticity of the medium, one of the resins being a film forming resin such as an acrylic resin.

The medium may be used to form a printing ink composition by the addition of suitable quantities of a pigment, flux or other required constituent.

According to a further aspect of the invention there is provided a printing composition which is fluid at temperatures between 40° and 80° C., will form a coherent film on a silicone transfer member and will release completely therefrom and solidify immediately on contact with the surface of an article to be decorated, to form a non-tacky coating thereon.

The invention also provides a method of decorating an article comprising forming an image of the decoration in a flowable ink composition on a heated support, picking up the image from the support on a silicone transfer member at a lower temperature to form a flexible film on the transfer member in a semi-fluid condition, and applying the film to an article to be decorated within a period of time during which the composition remains semi-fluid whereby the composition solidifies immediately on contact with the surface of the article to form a non-tacky coating thereon.

The term "complete release" is used herein to refer to a degree of release or transfer of the film leaving no visible or readily ascertainable trace thereof remaining on the transfer member.

The term "immediate" is used herein to refer to solidification which takes place instantaneously or within a few seconds.

The term "silicone" as used herein in relation to transfer members or pads is to be construed as referring to transfer members or pads at least the working surface of which consists of or incorporates a major proportion of silicone.

Any thermoplastic resin having the required thermoplasticity and thermal decomposition properties may be employed. Preferably, however, the resin is selected from cellulose ethers, styrenes, terpenes, methacrylates, rosins, modified rosins and rosin esters.

Suitable liquid resin diluents include triethylene glycol ester of rosin, hydrogenated methyl ester of rosin, low molecular weight (300–400) styrene resin and polyterpene derived from alpha-pinene.

Preferably the high molecular weight ester diluent is selected from materials within the melting point range 25°–50° C. and comprising the palmitates, stearates and laurates. Methyl palmitate (Melting Point 24° C.), methyl stearate (MP 36° C.), propylene glycol monostearate (MP 38° C.), stearyl laurate (MP 41° C.) and diethylene glycol monostearate (MP 44° C.) have been found particularly suitable. Other suitable esters include the phthalates such as diethoxyethyl phthalate (MP 34° C.) and dibenzyl phthalate (MP 42° C.), and the benzoates such as neopentyl glycol dibenzoate (MP 49° C.) and triethylene glycol dibenzoate (MP 47° C.).

Preferably the fatty alcohol diluents are selected from fatty alcohols having from 12 to 18 carbon atoms in the chain, including myristyl alcohol (MP 39° C.), cetyl alcohol (MP 49° C.) and stearyl alcohol (MP 58° C.).

The fatty acid diluents are preferably selected from those having 10 to 18 carbon atoms in the chain, including capric acid (MP 31.5° C.), lauric acid (MP 44° C.) and myristic acid (MP 58° C.).

The diluent must be compatible with the resin at elevated temperature since in the molten state (that is at operating temperature) it acts to reduce the melt viscosity of the resin to the required level for good printing performance.

Generally, two or more thermoplastic resins will be employed in combination to extend the thermoplasticity of the ink composition. Preferably one resin has a softening point within the range 105°–170° C. and the other a softening point within the range 5°–90° C. It is particularly advantageous that one of the resins used should be a true film former in order to impart high internal cohesion to the ink film and to assist in maintaining its integrity during the transfer operation from the silicone surface to the article being printed.

The viscosity of the composition may be altered to suit desired requirements. Relatively low viscosity compositions are desirable when dealing with patterns or decorations having fine detail, whereas higher viscosity can be used in other cases. The viscosity can be controlled by means of the proportion of resin to diluent utilised without substantially affecting the physical performance of the composition. Suitable viscosities are those within the range 1-60 poises at a shear rate of 615 sec$^{-1}$ within the operational temperature range of 40°-80° C.

The following are examples, given by way of illustration only, of decorating mediums according to the invention, all proportions being by weight.

EXAMPLE 1

Underglaze Medium for printing on to porous earthenware at a temperature of 65° C.–70° C.

| | |
|---|---|
| Methacrylate Resin (softening point 120°-140° C.) | 20% |
| Styrene Resin (softening point 50° C.) | 20% |
| Diethylene Glycol Monostearate (melting point 44° C.) | 60% |

EXAMPLE 2

Underglaze medium for printing on to vitrified earthenware at a temperature of 55°-60° C.

| | |
|---|---|
| Methacrylate Resin (softening point 150°-160° C.) | 30% |
| Terpene Resin (softening point 25° C.) | 20% |
| Stearyl Laurate (melting point 41° C.) | 50% |

EXAMPLE 3

Onglaze pottery medium for printing at a temperature of 55° C.-60° C.

| | |
|---|---|
| Methacrylate Resin (softening point 130°-140° C.) | 28% |
| Styrene Resin (softening point 75° C.) | 5% |
| Propylene Glycol Monostearate (melting point 38° C.) | 67% |

EXAMPLE 4

Inglaze pottery medium for printing at a temperature of 50° C.-55° C.

| | |
|---|---|
| Methacrylate Resin (softening points 130°-140° C.) | 40% |
| Styrene Resin (softening point 5° C.) | 2% |
| Methyl Stearate (melting point 36° C.) | 58% |

EXAMPLE 5

Borosilicate or soda glass medium for printing at a temperature of 60° C.-65° C.

| | |
|---|---|
| Ethyl Cellulose (softening point 150°-160° C.) | 12% |
| Terpene Resin (softening point 10° C.) | 78% |
| Methyl Palmitate (melting point 25° C.) | 10% |

EXAMPLE 6

Medium for printing on to enamelled iron or enamelled aluminium at a temperature of 45° C.-50° C.

| | |
|---|---|
| Methacrylate Resin (softening point 105°-115° C.) | 10% |
| Terpene Resin (softening point 25° C.) | 30% |
| Methyl Stearate (melting point 36° C.) | 60% |

EXAMPLE 7

Underglaze medium for printing on to porous earthenware at 50° C.–55° C.

| | |
|---|---|
| Glycerol Rosin Ester (softening point 73°-78° C.) | 50% |
| Isobutyl Methacrylate (softening point 105°-115° C.) | 20% |
| Myristyl Alcohol (melting point 39° C.) | 30% |

EXAMPLE 8

Borosilicate or sodaglass medium for printing at a temperature of 70° C.–75° C.

| | |
|---|---|
| Isobutyl Methacrylate (softening point 130°-140° C.) | 13.5% |
| Styrene resin (softening point 5° C.) | 76.5% |
| Cetyl alcohol (melting point 49° C.) | 34.5% |

EXAMPLE 9

Underglaze medium for printing on to vitrified earthenware at a temperature of 60° C.–65° C.

| | |
|---|---|
| Rosin maleic pentaerythritol ester (softening point 123° C.-127° C.) | 55% |
| Methyl ester of hydrogenated rosin (liquid) | 5% |
| Stearyl Alcohol (melting point 58° C.) | 40% |

EXAMPLE 10

Inglaze pottery medium for printing at a temperature of 75° C.-80° C.

| | |
|---|---|
| Isobutyl Methacrylate (softening point 105°-115° C.) | 12% |
| Terpene resin (liquid) | 88% |

EXAMPLE 11

Medium for printing on to enamelled iron at a temperature of 55° C.–60° C.

| | |
|---|---|
| Isobutyl Methacrylate (softening point 130-140° C.) | 25% |
| Styrene resin (softening point 5° C.) | 37.5% |
| Lauric acid (melting point 44° C.) | 37.5% |

Decorating compositions can be prepared from the carrier mediums set out in Examples 1-11 by dispersing in the medium a proportion of an appropriate colouring material or pigment to suit the article to be printed. In the case of underglaze decoration of pottery, underglaze colours would be utilised and likewise onglaze colours would be adopted in respect of mediums intended for use in the onglaze decoration of pottery. Generally the ink composition will consist of 40-80% colouring material and 60-20% carrier medium.

Decorating compositions according to the invention may be applied using a variety of different printing techniques. In one arrangement the composition may be applied to a heated intaglio plate on which the pattern to be applied to the article is engraved or etched, the transfer pad serving to pick up the inked image from the plate and transfer it to the article. In an alternative arrangement the decorating ink may be applied through a heated screen on to a heated flat plate, the image being subsequently picked up from the flat plate by means of the silicone transfer member. In a further arrangement, the pattern may be screened on to a heated silicone or silicone coated diaphram, the diaphram then being used as a carrier to transfer the screened pattern to a position above the ware where it is pressed into contact with the ware by the silicone pad or a similar conforming pressure member. Other forms of apparatus may also be used in association with decoration compositions according to the invention.

The operating conditions require to be such that the ink is fluid when the initial image is formed and will adhere satisfactorily to the transfer member or pad when picked up from the plate or the like on which the image is supported. A coherent film in a semi-fluid state is formed on the pad during transfer to the article but care is necessary to ensure that the film does not dry or solidify on the pad. This may be controlled by varying the proportion of diluent to resin.

The operating temperatures may be varied dependent on the composition of the medium, the article to be decorated and the apparatus utilized. In general however the plate or the like on which the image is supported will be at a temperature of 40°–80° C., and the pad will operate at a temperature of the order of 25°–50° C., due to the heat imparted to the pad by contact with the decorating composition and the plate, the article being at ambient temperature of the order of 16°–28° C. The time the composition remains on the pad may also vary considerably to suit individual circumstances but will generally be of the order of 0.01–30 seconds.

Decorating compositions of the kind described above have the advantage that once machine operating conditions are set there is little or no need for further adjustment throughout the production run. Furthermore, the physical properties of the composition do not change during the printing operation irrespective of the length of time for which printing is carried out. A multiplicity of colours may be printed one following the other without the problem of decorating ink remaining on the silicone transfer member and subsequently causing spoilage of the final decoration.

Ink compositions according to the invention also have a superior capability for resolving fine image detail compared with conventional decorating means. This is due to the fact that when the silicone transfer surface contacts the ink in its fluid state, the lower surface temperature of the silicone results in an instantaneous change in state of the ink rheology from fluid to semi-solid. Consequently, the ink does not flow or spread and the most minute image detail is maintained virtually in its original form.

Various modifications may be made without departing from the invention. For example, other compositions having the desired physical properties may be utilised and though principally evolved for the decoration of heat resistant substrates by means of silicone transfer members, ink compositions according to the invention may be used for the decoration of articles made of other materials such as plastics materials and using different forms of equipment.

We claim:

1. A solvent-free ink for use in offset printing by means of a silicone pad on an article of ceramic and like materials, said ink consisting of:
   40–80% by weight of coloring material, and
   60–20% by weight of a printing medium which becomes fluid at a temperature of 40°–80° C., has a viscosity of 1–60 poises at a shear rate of 615 sec$^{-1}$ in the temperature range of 40°–80° C., the printing medium consisting of:
   a mixture of 30–98% by weight of a thermoplastic component consisting of a film-forming thermoplastic resin having a softening point within the range 105°–170° C. selected from the group consisting of methacrylate resin, ethyl cellulose, isobutyl methacrylate and rosin maleic pentaerythritol ester and another thermoplastic resin of lower softening point within the range of 5°–90° C. selected from the group consisting of styrene resin, glycerol rosin ester and methyl ester of hydrogenated rosin, and 70–2% by weight of a diluent selected from the group consisting of (a) an ester selected from palmitates, stearates and laurates, (b) a fatty alcohol selected from myristyl alcohol, cetyl alcohol and stearyl alcohol and (c) a saturated fatty acid selected from capric acid, lauric acid and myristic acid,
   said ink forming in use a coherent but semi-fluid film on the silicone pad and transferring in its entirety from the pad to the article to form immediately a solid coating on the article.

2. An ink according to claim 1, wherein the printing medium consists of methacrylate resin, styrene resin and diethylene glycol monostearate.

3. An ink according to claim 1, wherein the printing medium consists of methacrylate resin, styrene resin and propylene glycol monostearate.

4. An ink according to claim 1, wherein the printing medium consists of methacrylate resin, styrene resin and methyl stearate.

5. An ink according to claim 1, wherein the printing medium consists of isobutyl methacrylate, glycerol rosin ester and myristyl alcohol.

6. An ink according to claim 1, wherein the printing medium consists of isobutyl methacrylate, styrene resin and cetyl alcohol.

7. An ink according to claim 1, wherein the printing medium consists of rosin maleic pentaerythritol ester, methyl ester of hydrogenated rosin and stearyl alcohol.

8. An ink according to claim 1, wherein the printing medium consists of isobutyl methacrylate, styrene resin and lauric acid.

9. A solvent-free ink for use in offset printing by means of a silicone pad on an article of ceramic and like materials, said ink consisting of:
   40–80% by weight of coloring material, and
   60–20% by weight of a printing medium which becomes fluid at a temperature of 40°–80° C., has a viscosity of 1–60 poises at a shear rate of 615 sec$^{-1}$ in the temperature range of 40°–80° C., the printing medium consisting of:
   a mixture consisting of a film-forming thermoplastic resin having a softening point within the range 105°–170° C. selected from the group consisting of methacrylate resin, ethyl cellulose, isobutyl methacrylate and rosin maleic pentaerythritol ester, and a liquid resin diluent selected from the group consisting of triethylene glycol ester of rosin, hydrogenated methyl ester of rosin and styrene resin having a molecular weight of 300–400,
   said ink forming in use a coherent but semi-fluid film on the silicone pad and transferring in its entirety from the pad to the article to form immediately a solid coating on the article.

10. An ink according to claim 1, wherein the ester is selected from methyl palmitate, methyl stearate, propylene glycol monostearate, stearyl laurate and diethylene glycol monostearate.

* * * * *